(12) United States Patent
Korton et al.

(10) Patent No.: US 6,212,250 B1
(45) Date of Patent: Apr. 3, 2001

(54) FUEL ELEMENT CLOSURE METHOD

(75) Inventors: George Korton; Cyril C. Hussey, both of Hamilton, OH (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 04/472,759

(22) Filed: Jul. 13, 1965

(51) Int. Cl.$^7$ .................................................. G21C 3/04
(52) U.S. Cl. ..................... 376/261; 376/409; 376/421; 376/451; 219/121.14; 228/193; 29/890.043
(58) Field of Search ................. 29/470, 473.3, 29/471.5, 475, 400, 890.043; 176/67, 72, 79, 83; 264/5; 376/261, 409, 421, 451; 228/193, 195, 183

(56) References Cited

U.S. PATENT DOCUMENTS 2,969,312 * 1/1961 Monsor ........................... 176/83 X \* cited by examiner

*Primary Examiner*—Harvey E. Behrend
(74) *Attorney, Agent, or Firm*—Emily G. Schneider; William R. Moser; Paul A. Gottlieb

(57) ABSTRACT

A method for providing a leak-tight metal enclosure to a fuel matrix penetrated by coolant channels, wherein the mutually contacting surfaces of said metal enclosure and said fuel matrix are metallurgically bonded, comprising placing a metal cladding about the lateral surface of said fuel matrix; disposing metal coolant tubes within said coolant channels; placing a perforated header plate having tubular extensions at each end of the fuel matrix from which the coolant tube ends protrude, said coolant tubes passing through said perforated header plate and said tubular extensions and terminating even with the ends of said extensions; welding, under vacuum, said cladding to said header plates, and the ends of said coolant tubes to the ends of said tubular extensions; exposing the assembly comprising the fuel matrix and enclosure to a gas at high temperature and pressure; and machining said header plates to provide a finished fuel element.

4 Claims, 2 Drawing Sheets

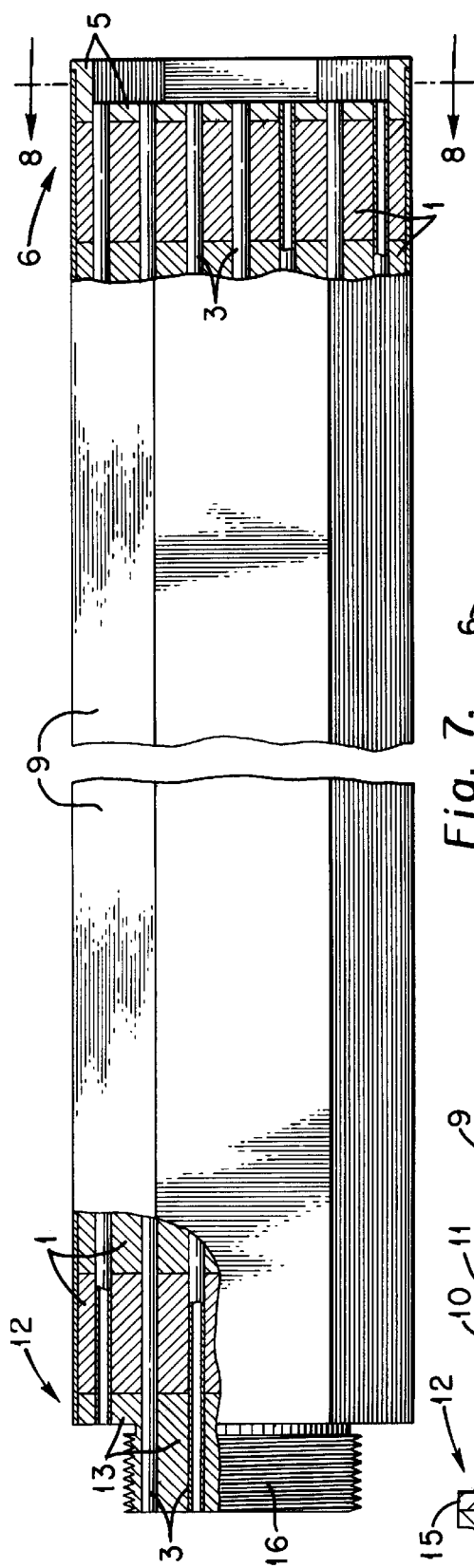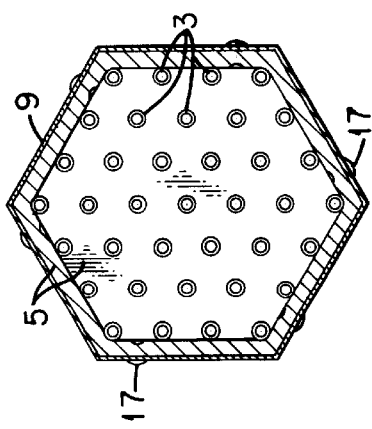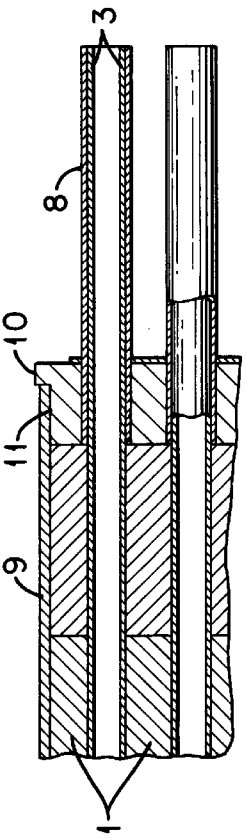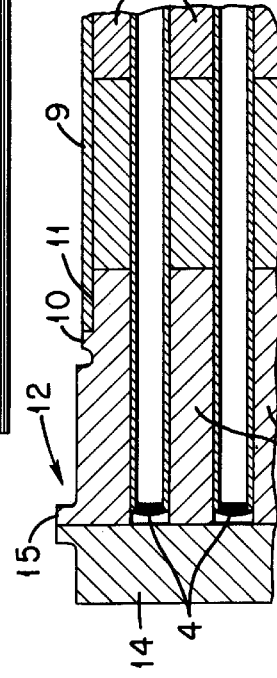

FUEL ELEMENT CLOSURE METHOD

This invention relates generally to fuel elements for neutronic reactors and more particularly to a method for providing a leak-tight metal enclosure for a high-performance matrix-type fuel element penetrated longitudinally by a multiplicity of coolant tubes.

The utilization of nuclear energy in high-performance, compact-propulsion and mobile power-generating systems has necessitated the development of fuel elements which can operate with high power densities. High power densities in turn require fuel elements having high thermal conductivities and fuel retention capabilities at high temperature.

A clad fuel element containing a ceramic phase of fuel intimately mixed with and bonded to a continuous refractory metal matrix has been found to satisfy the above requirements. Metal coolant tubes penetrate the matrix so as to provide positive fuel retention and containment of products generated within the matrix by fissioning of the fuel contained therein. Metal header plates are bonded to the coolant tubes at each end of the fuel element and a metal cladding or can completes the fuel-matrix enclosure by encompassing the sides of the fuel element between the header plates.

The ability of the fuel element to operate at a high power density is also dependent to a large extent upon the nature of the bond existing between the fuel matrix and the coolant tubes extending therethrough, particularly where the cladding is a cooling surface. Large temperature drops with resultant losses in efficiency occur where no metallurgical bond exists between the fuel matrix and coolant tubes.

The complete fuel-matrix enclosure, which comprises the coolant tubes, header plates, and cladding must also be of the highest integrity so as to avoid losses of fission products at the extreme operating conditions experienced by the fuel element.

It is, accordingly, a general object of the invention to provide a method for metallurgically bonding a complete leak-tight metal enclosure to a matrix-type fuel element which is penetrated longitudinally by a multiplicity of coolant channels.

Another object of the invention is to provide a method for metallurgically bonding a complete metal enclosure to a matrix-type fuel element which is penetrated longitudinally by a multiplicity of coolant channels, wherein a minimum number of coolant tube-to-header plate welds are required.

Another object of the invention is to provide a method for metallurgically bonding a complete metal enclosure to a matrix-type fuel element which is penetrated longitudinally by a multiplicity of coolant channels, wherein metal coolant tubes penetrating the channels are diffusion bonded to the header plates and coolant channel walls in the same operation used to diffusion bond the metal cladding to the fueled matrix and header plates.

Other objects of the invention will become apparent from an examination of the following description of the invention and the appended drawings, wherein:

FIG. 4 is an enlarged partial view in section of a first end of the fuel element assembly of FIG. 1;

FIGS. 5 is an enlarged partial view in section of a header plate assembly which may be used as an alternative to the header plate shown in FIG. 4;

FIG. 6 is an enlarged partial view in section of the remaining end of the fuel element assembly of FIG. 1;

FIG. 7 is a longitudinal plan view, partly in section, of the fuel element assembly of FIG. 1 after pressure bonding and machining of its header plates; and FIG. 8 is an end view of the fuel element assembly of FIG. 7.

In accordance with the present invention, an improved method for metallurgically bonding a complete leak-tight metal enclosure to a matrix-type fuel element penetrated longitudinally by a multiplicity of coolant channels is provided. Metal coolant tubes are sealed at one end and then placed in the coolant channels. Header plates, perforated to match the coolant channels in the fuel matrix, are disposed at each end of the fuel matrix to accommodate the coolant tube ends. Metal cladding is placed about the fuel matrix and welded to the header plates. A cover plate is welded to the header plate which accommodates the sealed coolant tube ends, and the open coolant tube ends are welded to tubular extensions from the other header plate. All welding operations are performed in vacuum using electron-beam welding techniques. The completely enclosed and sealed fuel element assembly is then exposed to a high temperature and pressure gas environment so as to effect a metallurgical bond between the contacting surfaces of the fuel matrix, coolant tubes, header plates, and cladding. After this operation is completed, the ends of the assembly are machined so as to open the closed coolant tube ends and to remove the header plate extensions at the open coolant tube ends.

Figure 1:
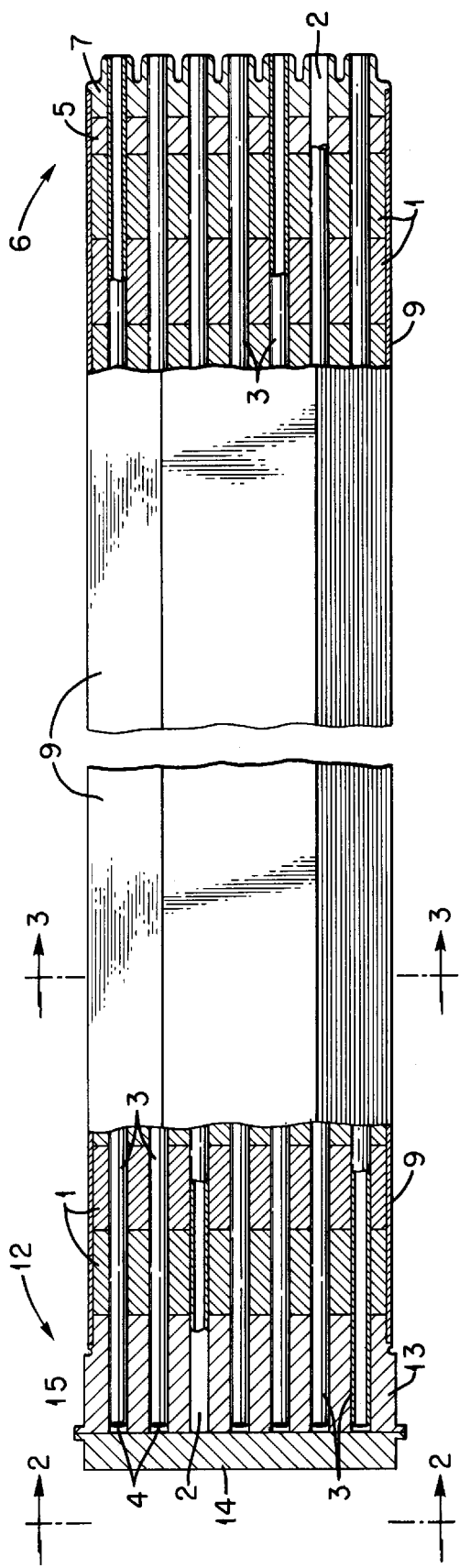
FIGS. 1 is a longitudinal plan view, partly in section, of a fuel element assembly which has been prepared for a pressure-bonding operation in accordance with the present invention.
Figure 3:
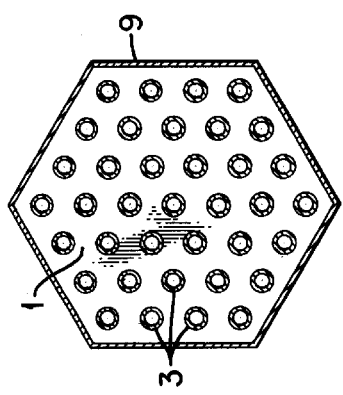
FIG. 3 is a transverse sectional view of the fuel element of FIG. 1 taken along line 3—3 showing the arrangement of coolant tubes and fuel matrix therein.

In order to facilitate an understanding of the invention, reference is made to FIGS. 1–6, initially to FIG. 1, wherein a fuel element assembly which has been prepared for a hot gas pressure-bonding operation is illustrated. A fuel matrix with a refractory metal such as tungsten forming the matrix material and uranium dioxide as fuel, is penetrated longitudinally by a multiplicity of coolant channels 2. The fuel matrix is formed from a plurality of axially aligned hexagonal fuel compacts. Tantalum coolant tubes 3, sealed at their ends 4 by welding, are fitted within the coolant channels 2. The hexagonal configuration of the fuel compacts and the manner in which the coolant tubes 3 are disposed therein will be more apparent upon examination of FIG. 3 where a cross-sectional view of the fuel element assembly of FIG. 1 is shown.

In order to minimize thermal expansion differences between the header plates and fuel matrix an inner header plate 5 of dissimilar material than the clad and having a hexagonal shape and a hole pattern identical to that of the coolant channels in the fuel compacts may be disposed immediately adjacent the fuel matrix at end 6 of the fuel assembly. An enlarged sectional view of end 6 is illustrated in FIG. 4. An outer tantalum header plate 7, also having a hexagonal shape and matching hole pattern to accommodate coolant tubes 3, abuts with inner header plate 5 to complete the closure of end 6 of the assembly. Tubular extensions 8 are provided from outer header plate 7 at each coolant tube penetration to facilitate welding the coolant tubes to the header plate. The open coolant tube ends are butt-welded to the ends of the tubular extensions which have a wall thickness substantially equal to the wall thickness of the coolant tubes in order to minimize welding-induced thermal stresses in the outer header plate. The tubular extensions 8 as shown in FIGS. 1 and 4 are fabricated using electrical discharge machining and are integral with the remaining portion of header plate 7.

FIG. 5 shows an alternative header plane embodiment for use on end 6 of the assembly where a large number of fine coolant tubes are required or where electrical discharge machining apparatus is not available. In this embodiment separate tubular extensions 8 are brazed to a header plate 7 prior to assembly of the fuel element for bonding.

FIGS. 1, 4, and 5 also illustrate how a tantalum cladding or can 9 is used to enclose the lateral surface of the fuel element so as to prevent the escape of fission products therefrom. Tantalum can 9 is butt-welded to a lip 10 extending about the lateral periphery of header plate 7. A relatively large area of contact 11 is provided between the tantalum can 9 and header plate 7 so as to ensure a satisfactory diffusion bond therebetween during the subsequent high-temperature and pressure-bonding operation.

Figure 2:
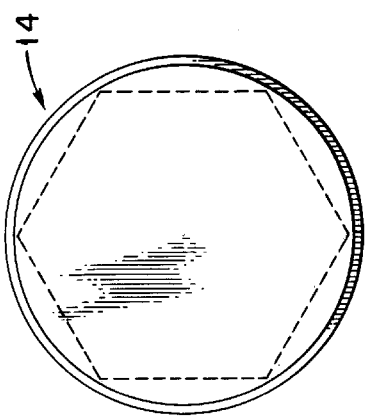
FIG. 2 is an end view of the fuel element of FIG. 1 showing the closure plate which seals one end thereof.

FIG. 6 is an enlarged sectional view of end 12 of the fuel element assembly of FIG. 1. As shown, the ends of coolant tubes 3 are welded shut and terminate within a header plate 13 which is made massive so that machining operations, which will be described in a later reference to FIG. 7, may be performed thereon. A circular cover plate or cap 14 is placed over the end of header plate 13 and butt-welded thereto about its periphery. Header plate 13, which is otherwise hexagonal in shape, is provided with a circular flange 15 to facilitate such a welding operation. FIG. 2 provides an end view of cap 14. Other features and fuel element assembly components shown in FIG. 6 are referenced with numerals which correspond to numerals referring to equivalent components in FIGS. 1–5. The prior description of FIGS. 1–5 will serve as a description of FIG. 6 where identical reference numerals are used in the figure but are not referred to in the above description of FIG. 6.

FIGS. 7 and 8 are a plan and an end view, respectively, of the fuel element assembly of FIG. 1 after it has been hot gas pressure bonded and the header plates 5, 7,and 13 have been machined to provide a finished fuel element. As shown at end 12 of the finished fuel element, cap 14 has been removed and header plate 13 machined to provide a threaded central extension 16 suitable for engagement with a fuel element latching mechanism. Other suitable configurations for engaging fuel element mechanisms will be apparent to those skilled in the nuclear reactor art. The tubular extensions 8 as illustrated in FIGS. 1 and 4 have been machined away and a hexagonal depression encompassing all of the coolant tubes provided in header plate 5. The hexagonal depression facilitates making spacing nubs 17 which permit a multiplicity of fuel elements to be assembled closely together in a reactor core with only point contact therebetween. The close assembly minimizes neutron streaming and coolant flow-induced vibration, while the slight spacing provided by the nubs permits thermal expansion of the fuel elements without excessive interference.

The fuel element assembly as illustrated in FIG. 1 must be leak-tight to the hot high-pressure gas used in a bonding operation in order for a complete metallurgical bond to develop between the enclosure and the fuel matrix contained therein Any leakage through the enclosure during the bonding operation will tend to equalize the pressure within the enclosure with that outside, so that a pressure differential no longer exists across the enclosure to press it against the fuel matrix. Since the development of a diffusion bond between the enclosure and fuel matrix depends in part upon the two components being pressed together, no diffusion bond will develop in the presence of an enclosure leak.

In a typical fuel element fabrication done in accordance with the present invention, a fuel element assembly similar to that shown in FIG. 1 was assembled using electron beam welding in vacuum to join tantalum enclosure components as taught herein. The final sealing operation was then performed and the assembly tested for leaks by exposing it to 500 psi pressurization in helium followed by a mass spectrometer leak detection test. After the assembly was determined to be leak-tight it was hot gas pressure bonded. In this operation, the assembly was exposed to helium gas at 5000 psi and 3000° F. for one hour. The hot gas bonding operation was followed by machining operations to produce a finished fuel element. Ultrasonic testing indicated that complete metallurgical bonding existed between the tantalum enclosure and the fuel matrix.

Although only tantalum enclosure components have been referred to in the above description, the closure design and bonding technique can be applied to other refractory metals such as tantalum-10 tungsten, tungsten, tungsten-25 rhenium, molybdenum and molybdenum-base alloys, columbium, and others. Dissimilar refractory metals can be used for tubing and for the inner header plate without encountering serious welding problems inasmuch as the tube-to-header plate joint is effected by solid state diffusion bonding.

In an alternative embodiment, a fuel element assembly may be provided wherein header plate assemblies as shown in FIGS. 4 and 5 are utilized at both ends. Such an embodiment may prove advantageous where no serious problem exists in providing leak-tight coolant tube-to-header plate welds, where it is desired to minimize the number of different type welding and machining operations which are required to assemble and finish a fuel element, and where a minimum number of different components are desired in the fuel element assembly.

The above description of the invention was offered for illustrative purposes only, and should not be interpreted in a limiting sense. It is intended that the invention be limited only by the claims appended hereto.

What is claimed is:

1. A method for providing a leak-tight metal enclosure to a fuel matrix penetrated by coolant channels, wherein the mutually contacting surfaces of said metal enclosure and said fuel matrix are metallurgically bonded, said method comprising the steps of:

(a) placing a metal cladding about the lateral surface of said fuel matrix;

(b) disposing metal coolant tubes which have been sealed at one end within said coolant channels;

(c) placing a first perforated header plate having tubular extensions at that end of the fuel matrix from which the open coolant tube ends protrude, said coolant tubes passing through said first perforated header plate and said tubular extensions and terminating even with the ends of said extensions;

(d) placing a second perforated header plate at the other end of said fuel matrix, said sealed coolant tube ends terminating within the perforations substantially even with the outer end thereof;

(e) welding, under vacuum, said cladding to said first and second header plates, the open ends of said coolant tubes to the ends of said tubular extensions, and a cover plate over said second header plate;

(f) exposing the assembly comprising the fuel matrix and enclosure to a gas at high temperature and pressure; and (g) machining said first and second header plates to provide a finished fuel element.

2. A method for providing a leak-tight metal enclosure to a fuel matrix penetrated longitudinally by a multiplicity of coolant channels, wherein the mutually contacting surfaces of said metal enclosure and said fuel matrix are metallurgically bonded, said method comprising the steps of:

(a) placing a thin continuous sheet of metal cladding about the lateral surface of said fuel matrix;

(b) disposing metal coolant tubes which have been sealed at one end within said coolant channels;

(c) placing a first perforated header plate at that end of said fuel matrix from which the open ends of said coolant tubes protrude, said header plate having tubular extensions on its face disposed away from said fuel matrix, said tubular extensions being coaxial with the perforations through said header plate and spaced to receive said coolant tubes which terminate substantially even with the ends of said tubular extensions, said metal cladding partially overlapping said first header plate;

(d) placing a second perforated header plate at that end of said fuel matrix from which the sealed ends of said coolant tubes protrude, said sealed coolant tube ends terminating within the perforations through said second header plate substantially even with the outer end thereof, said metal cladding partially overlapping said second header plate;

(e) welding the ends of said metal cladding to said first and second header plates while under vacuum;

(f) welding a metal cover plate over said second header plate while under vacuum so as to seal the end thereof;

(g) welding the open ends of said coolant tubes to the ends of said tubular extensions while under vacuum;

(h) exposing said fuel matrix and metal enclosure to a gas at high temperature and pressure to effect a diffusion bond between the mutually contacting surfaces of said cladding, coolant tubes, header plates, and fuel matrix; and (i) machining said header plates so as to open said sealed coolant tube ends and achieve a finished fuel element.

3. A method for providing a leak-tight tantalum enclosure to a uranium fueled tungsten matrix penetrated longitudinally by a multiplicity of coolant channels, wherein said tantalum enclosure is diffusion bonded to said tungsten matrix, said method comprising the steps of:

(a) placing a thin continuous sheet of tantalum cladding about the lateral surface of said tungsten matrix;

(b) depositing tantalum coolant tubes which have been sealed at one end within said coolant channels;

(c) placing a first perforated tantalum header plate at that end of said tungsten matrix from which the open ends of said tantalum coolant tubes protrude, said header plate having integral tubular extensions on its face disposed away from said tungsten matrix, said tubular extensions being coaxial with the perforations through said header plate and spaced to receive said coolant tubes, said coolant tubes terminating substantially even with the ends of said tubular extensions, said tantalum cladding partially overlapping said first header plate;

(d) placing a second perforated tantalum header plate at that end of said tungsten matrix from which the sealed ends of said coolant tubes protrude, said sealed coolant tube ends terminating within the perforations through said second header plate substantially even with the outer end thereof, said tantalum cladding partially overlapping said second header plate;

(e) electron beam welding the ends of said tantalum cladding to said first and second header plates while under vacuum;

(f) electron beam welding a metal cover plate over said second header plate while under vacuum so as to seal the end thereof;

(g) electron beam welding the open ends of said coolant tubes to the ends of said tubular extensions while under vacuum;

(h) exposing said tantalum-enclosed tungsten matrix to helium at high temperature and pressure for a time sufficient for a diffusion bond to develop between the mutually contacting surfaces of said tantalum cladding, coolant tubes, header plates, and the uranium fueled tungsten matrix;

(i) machining away said tubular extensions together with the coolant tube portions contained therein; and (j) removing said cover plate and machining away a sufficient portion of said second perforated header plate so as to open said coolant tube ends bonded therein.

4. A method for providing a leak-tight metal enclosure to a fuel matrix penetrated by coolant channels, wherein the mutually contacting surfaces of said metal enclosure and said fuel matrix are metallurgically bonded, said method comprising the steps of:

(a) placing a metal cladding about the lateral surface of said fuel matrix;

(b) disposing metal coolant tubes within said coolant channels;

(c) placing a perforated header plate having tubular extensions at each end of the fuel matrix from which the coolant tube ends protrude, said coolant tubes passing through said perforated header plate and said tubular extensions and terminating even with the ends of said extensions;

(d) welding, under vacuum, said cladding to said header plates, and the ends of said coolant tubes to the ends of said tubular extensions;

(e) exposing the assembly comprising the fuel matrix and enclosure to a gas at high temperature and pressure; and (f) machining said header plates to provide a finished fuel element.

* * * * *